United States Patent
Caldwell

(10) Patent No.: US 6,736,964 B1
(45) Date of Patent: May 18, 2004

(54) APPARATUS FOR SEPARATING MIXED FLUIDS AND MEASURING QUANTITY OF COMPONENT FLUIDS

(76) Inventor: Dennis Paul Caldwell, 2518 Duncan, Pampa, TX (US) 79065

( * ) Notice: Subject to any disclaimer, the term of this patent is extended or adjusted under 35 U.S.C. 154(b) by 71 days.

(21) Appl. No.: 10/255,983

(22) Filed: Sep. 26, 2002

(51) Int. Cl.[7] ............................................. B01D 35/00
(52) U.S. Cl. ...................... 210/87; 210/123; 210/257.1; 210/533; 210/540; 210/115; 137/174; 137/192
(58) Field of Search .......................... 210/87, 121, 123, 210/257.1, 513, 533, 540, 115, 800; 137/192, 174; 73/200

(56) References Cited

U.S. PATENT DOCUMENTS

| | | |
|---|---|---|
| 635,703 A | 10/1899 | St. Mary |
| 1,074,591 A | 9/1913 | Winorsky |
| 1,304,562 A | 5/1919 | Hammell |
| 4,327,764 A | 5/1982 | Biederman |
| 4,951,700 A * | 8/1990 | Kalman ...................... 137/174 |
| 5,101,852 A | 4/1992 | Magnasco |
| 5,115,798 A | 5/1992 | Moore, Jr. |
| 5,698,014 A * | 12/1997 | Cadle et al. .................. 96/157 |
| 5,705,056 A | 1/1998 | Scragg |
| 6,368,498 B1 * | 4/2002 | Guilmette .................... 210/123 |

* cited by examiner

Primary Examiner—Terry K. Cecil
(74) Attorney, Agent, or Firm—Randal D. Homburg

(57) ABSTRACT

The apparatus for separating and measuring mixed fluids, specifically the separation of crude oil and water and the volumetric measurement of each of the mixed fluids using a mechanical portable device primarily involving a separation vessel, an adjustable float within the vessel which allows the fluid of less specific gravity to be released from the top of the separation vessel through an upper pipeline, the heavier specific gravity fluid to be released from the bottom of the separation vessel through a lower pipeline, with fluid volume meters on each of the pipelines to measure the liquid flowing through the respective pipelines, the apparatus presented as a portable unit transferable from one pumping device to another, allowing for an accurate measurement of the fluids being extracted by the pumping devices.

11 Claims, 4 Drawing Sheets

APPARATUS FOR SEPARATING MIXED FLUIDS AND MEASURING QUANTITY OF COMPONENT FLUIDS

CROSS REFERENCE TO RELATED APPLICATIONS

None

BACKGROUND OF THE INVENTION

1. Field of Invention

The apparatus for separating and measuring mixed fluids, specifically the separation of crude oil and water and the volumetric measurement of each of the mixed fluids using a mechanical portable device primarily involving a separation vessel, an adjustable float within the vessel which allows the fluid of less specific gravity to be released from the top of the separation vessel through an upper pipeline, the heavier specific gravity fluid to be released from the bottom of the separation vessel through a lower pipeline, with fluid volume meters on each of the pipelines to measure the liquid flowing through the respective pipelines, the apparatus presented as a portable unit transferable from one pumping device to another, allowing for an accurate measurement of the fluids being extracted by the pumping devices.

2. Relevant Background of the Field of Invention

Oil wells operate to extract petroleum products from the ground in the general form of a mixture of crude oil and water, including ground water and sometimes water injected into the ground to urge the oil from the confines of the earth or strata. For purposes of regulatory compliance and also to measure the mechanical and economic efficiency of the well outputs, it is desired to measure the output of the component fluids to ascertain the volume of the crude oil extract. Testing of each well site is recommended periodically, sometimes daily.

Problems encountered in the oil fields of the past have been identified as: (1) the accuracy of the measurement of the volume of constituent fluids being extracted from the well and transferred to the tank batteries; (2) the cost of the testing and measuring equipment; (3) the portability of the testing and measuring equipment; and (4) the probability of failure and mismeasurement of prior art measuring equipment and methods.

Current devices and methods do not satisfactorily address these prior problems. In order to accurately ascertain the volumes of the fluid constituents, is common to take a random test from the battery or well by placing a collection device in the field for a period of time, determining the gross total of fluid, measuring each of the separated fluids, and mathematically extrapolating the measured fluid over the time span desired to be measured. Since these tank batteries may contain fluids from several different wells, individual well output is not measured by these testing procedures.

Another procedure involves the random sampling of a well output at a given time and mathematic estimation of this random sample over a time using an averaging method. This is a faulty method of determination of output, since there are numerous variables on a well's output at any given time, such variables including inconsistent line pressure and constituent fluid concentration variance from one moment to the next. Although valid statistically, this method is inaccurate and highly prone to error.

Yet another method involves the placement of a very costly apparatus which takes periodic measurements of the constituent fluids and plots such volume measurements on a graph over time. This is also inaccurate, as the graphs themselves show a great amount of variance, hence rendering this method highly suspect and still inaccurate.

3. Description of Prior Art

The following United States patents were discovered and are disclosed within this application for utility patent. All relate to devices with fluid separating components of some type or nature. In U.S. Pat. No. 5,101,852 to Magnasco, a airline separator includes a vessel containing a float wherein a moist air mixture is admitted to the vessel through an inlet in the top. An outlet is also provided in the top of the vessel for air to be passed from the vessel with an outlet provided in the bottom of the vessel for fluids. The float is provided with stems at its top and bottom for closing outlets depending upon the quantity of fluid in the vessel.

In U.S. Pat. No. 5,115,798 to Moore, Jr., a float having a ball-type valve is disclosed in a similar condensate trap in an exhaust gas conduit. These two patents, alone or in combination do not illustrate nor claim the components of the current apparatus, and are distinguishable. Magnasco is a device placed within a pneumatic air line to provide a liquid trap for air flowing through the device, the air being expelled through an upper outlet valve while the liquid components within the air, drop into the interior of the chamber. As the liquid in the chamber accumulates, it causes the float to rise, displacing the lower float rod from its sealed seat, allowing for the expulsion of the liquid through the lower outlet discharge port. The float also has an upper float rod which engages an upper finger member sealing off the upper output valve preventing expulsion of the liquid within the chamber from entering into the air output lines. This device cannot be used to separate liquids efficiently, and is not designed to do so, as the inlet is in the top of the device, wherein the heavier constituent would always be passing through the lighter constituent, thereby re-contaminating the lighter constituent during continuous flow, thereby requiring the components to be introduced into the chamber in small quantities, allowing for separation, draining of the fluids separately, and then adding more liquid and repeating this process over and over. A bucket with a drain hole could accomplish the same thing as the Magnasco patent applied to the purpose of the current invention. The inclusion of the ball valve in place of the float rods and seal members of Moore, Jr. would still not produce the desired purpose, function and task of the present apparatus.

Steam traps are disclosed in. U.S. Pat. No. 635,703 to St. Mary, and U.S. Pat. No. 1,304,562 to Hammell. Drain traps having float valves are disclosed in U.S. Pat. No. 4,327,764 to Biederman and U.S. Pat. No. 1,074,591 to Winarsky.

A diesel fuel separator is disclosed in U.S. Pat. No. 5,705,056 to Scragg, which is used to separate water from diesel fuel between the fuel tank and the fuel pump, the device including a inlet line within the fuel tank, the inlet to that line near the bottom of the fuel tank, such line being directed to a tube with a baffled inlet directing the fuel to the tube, around and through an element connected to a member, protruding into the top of a float, the element having holes to allow for passage of the fuel through the element. The float is further connected to a guide rod, which is connected to a cross member, which is slidably engaged with a pin, the pin engaging the seat of a second member which is located at the entrance of a discharge passage leading to an outlet where the water is discharged. Again, this device, in no way, could perform the same function as the current apparatus and include way too many elements defeating the simplicity of the current apparatus.

The apparatus has advantages and addresses the issues presented by prior art and processes. The apparatus and process requires nothing more than kinetic energy produced by the fluid flow for the basic apparatus to operate. The fluid is under constant pressure and motion as it travels through the apparatus, thereby reducing the possibility of the fluid or contaminants clogging or forming solid deposits within the vessel, the surge tank or any of the pipelines, meters, inlets or outlets. Fluid is measured without draining or opening the lines. With the float mechanism suspended within the fluid and in constant motion so long as a fluid flow is maintained in the apparatus and the ball seals on the upper and lower ends attaching in tandem on the float member prevents the ball seals from becoming stuck within the tapered interior seats. Short of a cataclysmic failure or damage to the entire float member, the apparatus cannot experience a seat or seal from opening or closing as the fluid volumes are constantly changed. Additionally, because the float member would be biased towards keeping the upper and lower outlets opened, due to the float member adjusted to be suspended between the upper and lower outlets, the fluid measurement is ongoing, thereby eliminating the need to guess, estimate of statistically deduce the fluid flow from the well, the meters conducting actual measurement of the fluid flow at a given moment, or a short or long period of time.

SUMMARY OF THE INVENTION

The primary objective of the invention is to provide a portable separating and measuring device for the separation of mixed fluids, primarily crude oil and water mixtures from an oil well pump, and a method for separating such mixed fluids.

A secondary objective of the invention is to provide the apparatus comprising essentially a vertically oriented cylindrical vessel with an interior, an upper outlet in a top end of the vessel, a lower outlet in a bottom of the vessel and a side inlet approximately midway along its vertical height, an adjustably buoyant tubular vertical float member located within the interior of the cylindrical vessel having a ball seal on each end of the vertical float, an upper tapered valve seat and lower tapered valve seat adapted to sealably engage the ball seal on the vertical float, the valve seats sealably engaging the upper outlet and lower outlet respectively, each valve seat further connected to a pipeline including a fluid flow measuring meter, wherein the heavier specific gravity fluid flows from the lower outlet where its volume is measured while the lighter specific gravity fluid is expelled through the upper outlet where its volume is also measured, the two fluid then sent on to a remote tank battery for storage.

Further objectives and advantages of the present invention, as well as descriptions of preferred embodiments will be more fully understood from the drawings and specific details and claims below.

DESCRIPTION OF THE DRAWINGS

The following drawings are submitted with this utility patent application.

DESCRIPTION OF THE PREFERRED EMBODIMENT

Figure 1:
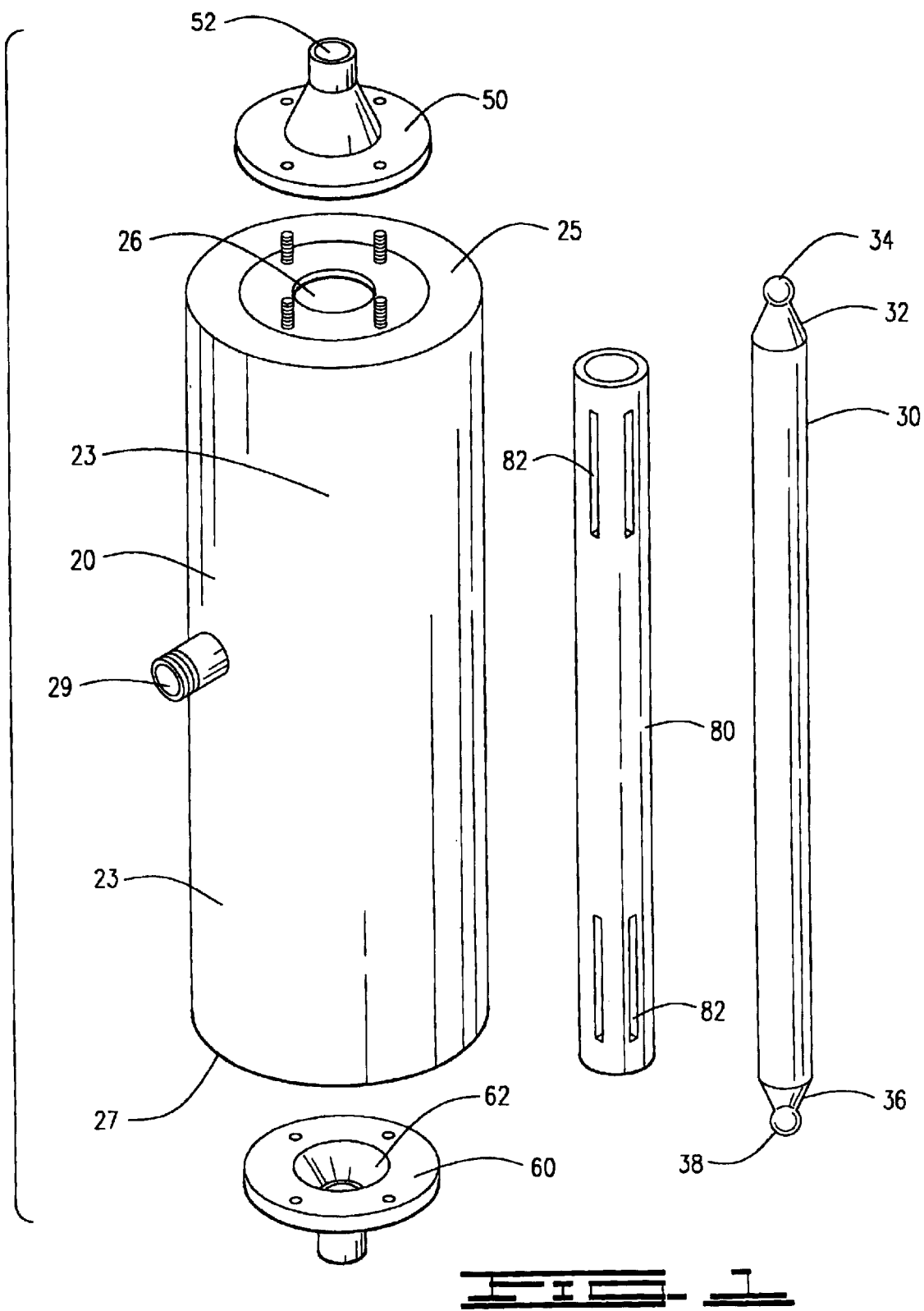
FIG. 1 is a composite view of the vertically oriented cylindrical vessel, the adjustably buoyant vertical float member, the upper tapered valve seat, the lower tapered valve seat, and the optional cylindrical float member housing.
Figure 2:
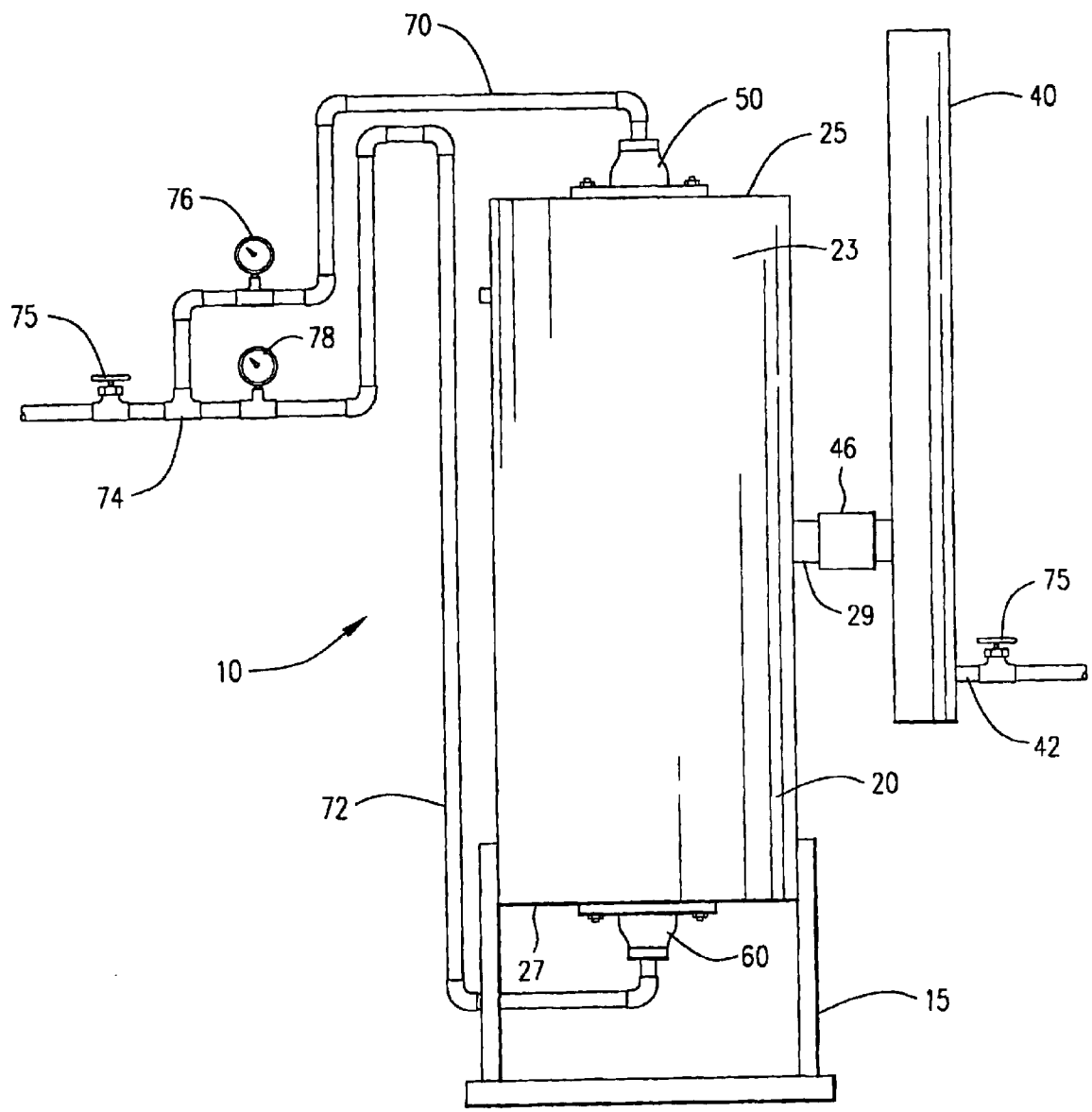
FIG. 2 is a side view of the assembled apparatus, including the external surge tank.

An apparatus for separating and measuring mixed fluids, directed especially towards the separation of crude oil and water and the volumetric measurement of each of the primary constituent fluids, shown in FIGS. 1–4 of the drawings, the apparatus 10 comprising essentially a vertically oriented cylindrical vessel 20 positioned on a support frame 15, the vessel 20 having an interior 21, an exterior surface 23, an upper outlet 26 located in a top portion 25 of the vessel 20, a lower outlet 28 located in a bottom portion 27 of the vessel 20 and an inlet 29 located approximately half way between the top portion 25 and bottom portion 27 from the exterior surface 23 into the interior 21 of the vessel 20, an adjustably buoyant vertical float member 30 positioned within the interior 21 of the vessel 20, the float member 30 having an upper end 32 and a lower end 36, an upper housing 50 attached to the upper outlet 26, a lower housing 60 attached to the lower outlet 28, each of the upper housing 50 and lower housing 60 having a tapered interior seat 52, 62 adapted to sealably engage rounded ball seals 34, 38 on the respective upper end 32 and lower end 36 of the float member 30, an external surge tank 40 connecting to the inlet 29, the external surge tank 40 further connected to the outlet of an oil well or fluid source, not shown nor claimed as part of the apparatus, a first pipeline 70 connecting to the upper housing 50 having a fluid flow measuring first meter 76 measuring the fluid flowing from the upper outlet 26 of the vessel 20, a second pipeline 72 connecting to the lower housing 60 having a fluid flow measuring second meter 78 measuring the fluid flowing from the lower outlet 28 of the vessel 20, and a third pipeline 74 beyond the first and second meters 76, 78 carrying the fluids to a remote storage tank or to a return line, also not claimed or shown as part of the apparatus.

Figure 3:
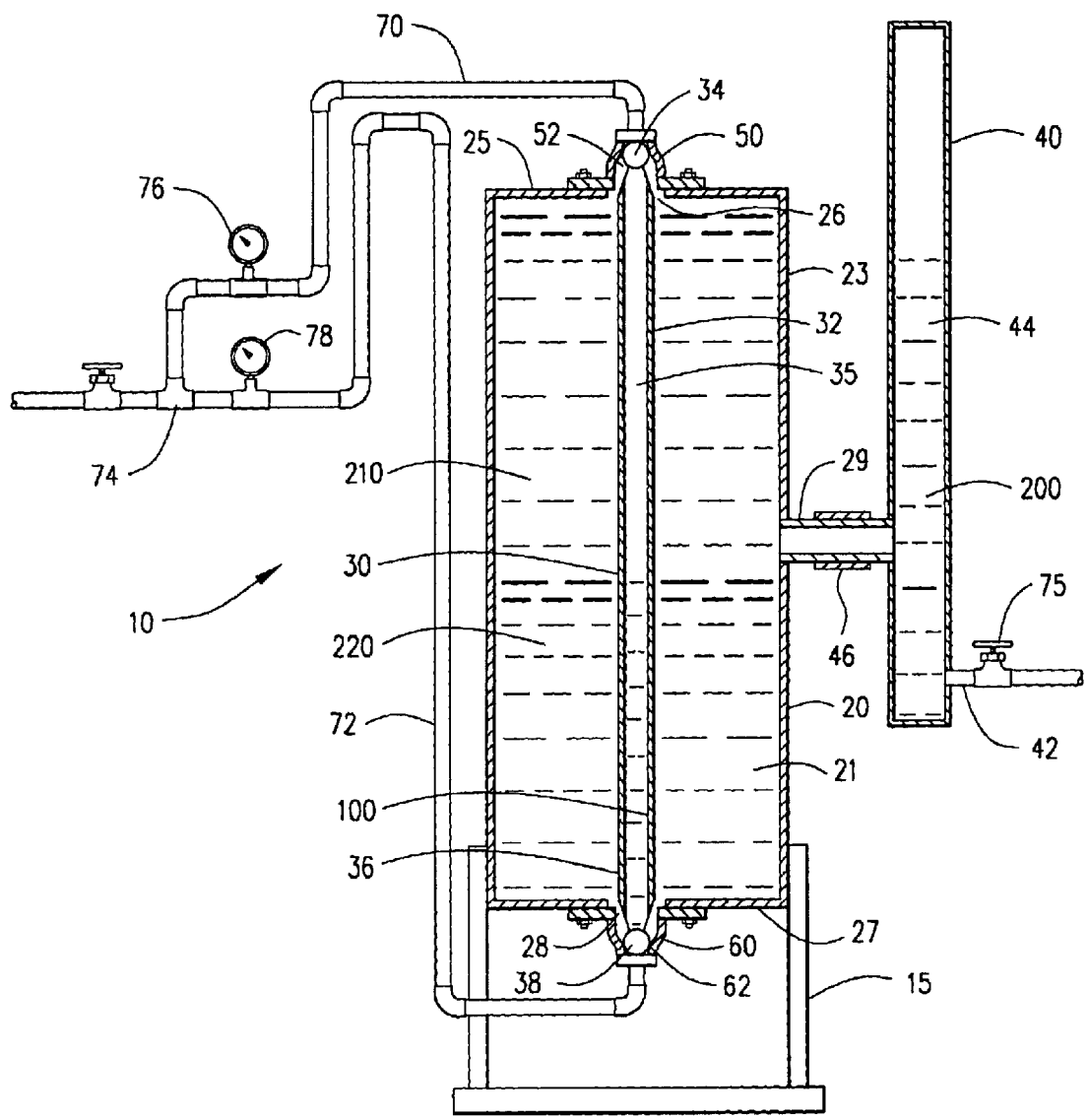
FIG. 3 is a cross-sectional side view of the assembled apparatus.

The float member 30, shown in FIG. 3 of the drawings, has a hollow interior 35 which may be filled with a neutral liquid ballast 100 to adjust the buoyancy of the float member 30, the float member having the upper end separable from the float member allowing access to the hollow interior 35.

The apparatus 10 may further comprise a float housing 80, shown only in FIG. 1 of the drawings, located within the interior 21 of the vessel 20, connecting the upper outlet 26 with the lower outlet 28 with the float member 30 contained within the float housing 80. The float member 30 has full and free movement within the float housing 80 without any substantial contact with the float housing 80. This float housing 80 has a plurality of grooved channels 82 allowing for the free flow of fluid in and out of the float housing 80, from the interior 21 of the vessel 20 to the float member 30 without restriction.

Figure 4:
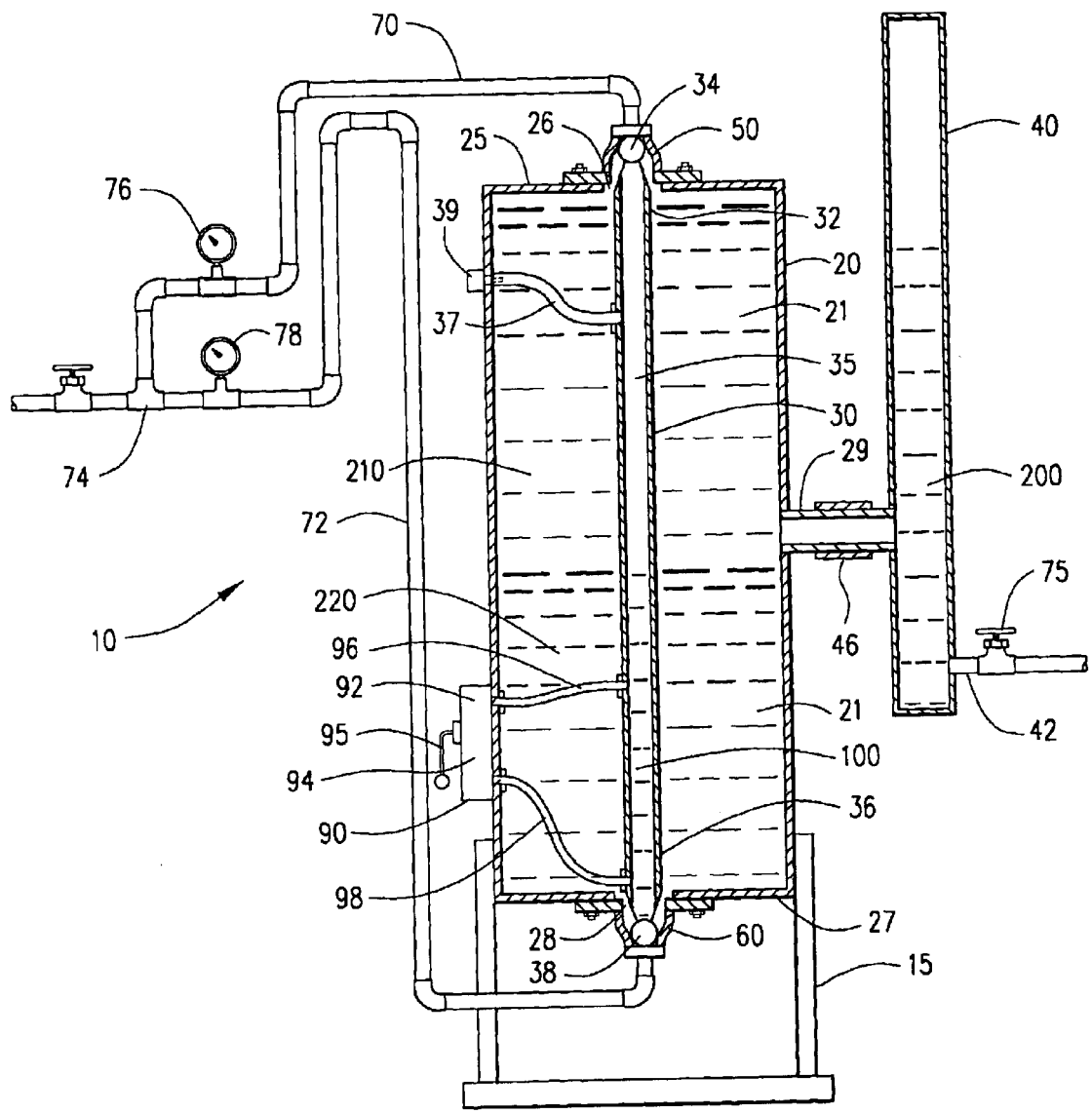
FIG. 4 is a cross-sectional side view of the assembled apparatus with the embodiment of the adjustably buoyant vertical float member having the externally controlled buoyancy adjustment mechanism outside the vertically oriented cylindrical vessel.

The surge tank 40, shown in FIGS. 3 and 4 of the drawings, further includes an inlet line connection 42, an internal chamber 44 and an outlet connection 46, attaching to the inlet 29 of the vessel 20. It is most preferred that the inlet line 42 is positioned lower on the surge tank 40 than the outlet connection 46, as experimentation has revealed that this orientation reduces the amount of fluid churn within the internal chamber 44 and produces a smoother flow of fluid from the internal chamber 44 thorough the outlet connection 46 to the inlet 29 of the vessel 20. In the event the apparatus 10 is used where a steady flow of fluid enters the vessel 20, without pulsation, the surge tank 40 may be omitted and the vessel 20 connecting directly to the fluid source at the inlet 29.

When assembled, a fluid mixture 200 is first introduced into the surge tank 80 where the fluid mixture 200 is allowed to collect, whereafter the fluid mixture 200 is transferred to the inlet 29 of the vessel 20. The fluid mixture 200 is then collected within the interior 21 of the vessel 20, where it separates into its fluid components of differing specific gravities, primarily crude oil as a lighter fluid 210, rising to the top portion 25 of the vessel 20, with a heavier fluid 220, primarily water, separating to the bottom portion 27 of the vessel 20. The float member 30, having the hollow interior 35 containing the neutral liquid ballast 100, preferably antifreeze liquid, is adjusted to float at a preferred adjusted level within the vessel 20, dependant upon a level of separation of the fluid mixture 200 within the vessel 20. When a quantity of heavier fluid 220 is reached in the tank, the float member 30 rises above the preferred adjusted level, urging the ball seal 38 on the lower end 36 of the float member 30 away from the tapered interior seat 62 of the lower housing 60, expelling the heavier fluid 220 from the lower outlet 28 into the second pipeline 72 where it is measured by the second meter 78. As that heavier fluid 220 is released, the float member 30 is lowered dropping the ball seal 34 on the upper end 32 of the float member 30 away from the tapered interior seat 52 of the upper housing 50, releasing the lighter fluid 210, or crude oil, through the upper outlet 26 into the first pipeline 70 where it is measured by the first meter 76. Cutoff valves 75 may be supplied on any of the first, second or third pipelines 72, 74, 76, or at the inlet line 42 to the surge tank 40.

In an alternative embodiment, shown in FIG. 4 of the drawings, an externally controlled buoyancy adjustment mechanism 90 is provided on the apparatus 10, allowing for the float member 30 to have its buoyancy adjusted without the need to disassemble the apparatus 10 or to manually fill the hollow interior 35 of the float member 30 with the neutral liquid ballast 100. The externally controlled buoyancy adjustment mechanism 90 comprising a fluid pump 92 having a fluid injection and extraction means 94 operated by a control lever 95, a fluid inlet line 96 connecting the fluid injection and extraction means 94 to the hollow interior 35 of the float member 30, and a fluid outlet line 98 connecting the hollow interior 35 at the lower end 36 of the float member 30 to the fluid injection and extraction means 94. This externally controlled buoyancy adjustment mechanism 90 thus operates to allow the introduction and extraction of the neutral liquid ballast 100 into the float member 30 by a pull or push of the control lever 95, adding or subtracting the neutral liquid ballast 100 from the hollow interior 35 of the float member 30 without disassembly of the apparatus 10. This embodiment may also provide the float member 30 with an air relief line 37 attached near the upper end 32 of the float member 30, the air relief line 37 further connecting to an air valve 39 located on the exterior surface 23 of the vessel 20, as shown in FIG. 4 of the drawings. This air valve 39 allows for the neutral liquid ballast 100 in the hollow interior 35 of the float member 30 to rise and fall with the addition or extraction of neutral liquid ballast 100 without concern over pressure or vacuum in the float member 30.

The ball seal 34 on the upper end 32 of the float member 30 is conformed to sealably engage the tapered interior seat 52 of the upper housing 50, while the ball seal 38 on the lower end 36 of the float member 30 is conformed to sealably engage the tapered interior seat 62 of the lower housing 60. The float member 30 is of a length to be contained between the upper housing 50 and the lower housing 60 when the housings are attached to the vessel 20, but the ball seals 34,38 on the upper end 32 and lower end 36 of the float member 30 are not engaged with the tapered interior seats 52, 62 of the upper housing 50 and lower housing 60 at the same time. This allows for either flow of the lighter fluid 210 from the upper outlet 26, heavier fluid 220 flow from the lower outlet 28 or both lighter fluid 210 and heavier fluid flow 220 from both the upper outlet 26 and lower outlet 28 simultaneously, but never restricting the fluid flow from both the upper outlet 26 and lower outlet 28 at the same time.

As the fluid passes through the respective first meter 76 and second meter 78, the quantity of fluids passing through the meters is recorded. In an alternative embodiment, these meters 76, 78 may be equipped with a remote interface means to allow the recorded volume of liquid passing through the meters to be wirelessly transmitted to a remote location, thereby avoiding the necessity to travel to a variety of locations to read the measurements recorded by the meters. This would be especially beneficial when numerous apparatus 10 are attached to numerous oil wells in distant locations.

It is contemplated within the scope of this invention that the geometric shape of the elements involved in the invention are of no functional distinction, although correlated to be suitable for the stated purpose of the invention. Therefore, the shape of the float member 30 and the vessel 20 may be hexagonal, square, cylindrical, as claimed and disclosed, triangular, oval, round or whatever shape may optimize the separation process.

Likewise, the shape of the ball seals 34, 38 and the tapered interior seat 52, 62 must be consistent insofar as forming a seal, but their respective shapes may be flat, conical or wedge-shaped, or the valve seats and seals may form a sliding gate assembly. Additionally, the sealable engagement between the ball seals 34, 38 and the tapered interior seats 52, 62 may be of varying porosities to inhibit or accentuate the pressure according to the requirements, pressure, or viscosity of the fluids be measured or separated.

The apparatus 10 may be furnished as a portable unit which would avoid having to disassemble the apparatus 10 when moving from one fluid source to another, enhancing transferability from one oil well to another, or it may be made a permanent part of the oil well. In the embodiments depicted in FIGS. 2–4, the vessel 20 is supported above the ground on the support frame 15. It is also contemplated that the apparatus 10 may be mounted on a cart, trailer or wagon, and may include a protective cover, not shown.

The apparatus 10 has advantages and addresses the issues presented by prior art and processes. The apparatus 10 and process requires nothing more than kinetic energy produced by the fluid flow for the basic apparatus 10 to operate. The fluid is under constant pressure and motion as it travels through the apparatus 10, thereby reducing the possibility of the fluid or contaminants clogging or forming solid deposits within the vessel 20, the surge tank or any of the pipelines, meters, inlets or outlets. Fluid is measured without draining or opening the lines. With the float member 30 suspended within the fluid and in constant motion so long as a fluid flow is maintained in the apparatus 10 and the ball seals 34, 38 on the upper end 32 and lower end 36 attaching in tandem on the float member 30, the constant motion prevents the ball seals 34, 38 from becoming stuck within the tapered interior seats 52, 62. Short of a cataclysmic failure or damage to the entire float member 30, the apparatus 10 cannot experience failure in a tapered interior seat 52, 62 or ball seals 34, 38 from opening or closing as the fluid volumes are constantly changed. Additionally, because the float member 30 would be biased towards keeping the upper outlet 26 and lower outlet 28 opened, due to the float member 30 adjusted to be suspended between the upper and lower outlets 26, 28, the fluid measurement is ongoing, thereby eliminating the need to guess, estimate of statistically deduce the fluid flow from the well, the meters conducting actual measurement of the fluid flow at a given moment, or a short or long period of time.

The apparatus 10 is also capable of separating other mixed fluids which may separate due to distinctly differing specific gravities or may be applied to environmental cleanup activity. In this use, it may be desirable to leave the fluid separated and not connect the first and second pipelines 70, 72 back together past the first and second meters 76, 78, porting the fluids to separate storage tanks or vessels. Additionally, in oil spills, it may be desirable to gather water at the spill site using a skimming technique and using the apparatus to separate the petroleum product from the seawater and return the seawater to the sea. Also, use of the first and second meters 76, 78, singularly or both, may be deleted during this type use.

While the invention has been particularly shown and described with reference to a preferred embodiment thereof, it will be understood by those skilled in the art that changes in form and detail may be made therein without departing from the spirit and scope of the invention.

What is claimed is:

1. An apparatus for separating and measuring mixed fluids of differing constituent specific gravity, attaching between a fluid source and a remote storage container, the apparatus comprising:

a vertically oriented vessel positioned on a support frame, said vessel having an interior, an exterior surface, an upper outlet located in a top portion, a lower outlet through the exterior surface into the interior, located in a bottom portion and an inlet located between the top portion and bottom portion;

an adjustably buoyant float member within the interior of the vessel, said float member having an upper end and a lower end, said upper end and lower end having ball seals;

an upper housing having a tapered interior seat adapted to sealably engage the ball seal on the upper end of the float member, the upper housing attached to the upper outlet of the vessel said float member having a hollow interior and means to inject liquid into or extract liquid from said hollow interior in order to adjust the buoyancy of said float member;

a lower housing having a tapered interior seats adapted to sealably engage the ball seal on the lower end of the float member, the lower housing attached to the lower outlet of the vessel;

an external surge tank connecting to the inlet, the external surge tank further connected to the fluid source;

a first pipeline connecting to the upper housing having a first fluid flow measuring meter measuring the quantity of fluid flowing from the upper outlet of the vessel;

a second pipeline connecting to the lower housing having a second fluid flow measuring meter measuring the quantity of fluid flowing from the lower outlet of the vessel; and, a third pipeline joining together after the two meters to carry the fluids to the remote storage container.

2. The apparatus as disclosed in claim 1, wherein the float member further comprises: said hollow interior being filled with a neutral liquid ballast to adjust the buoyancy of the float member and with the upper end of the float member being separable therefrom to provide access to the hollow interior.

3. The apparatus as disclosed in claim 1, further comprising a float housing located within the interior of the vessel, connecting the upper outlet with the lower outlet with the float member contained within the float housing, wherein the float member has full and free movement within the float housing without contact with the float housing, said float housing having grooved channels allowing for the free flow of fluid in and out of the housing, from the interior of the vessel to the float member without restriction.

4. The apparatus as disclosed in claim 1, the surge tank further comprising:

an inlet line connection, an internal chamber and an outlet connection, attaching to the inlet of the vessel with the inlet line applied lower on the surge tank than the outlet connection.

5. The apparatus as disclosed in claim 1, the apparatus having an externally controlled buoyancy adjustment mechanism allowing for the float member to have its buoyancy adjusted without the need to disassemble the apparatus or to manually fill the interior of the float member with a neutral liquid ballast, said externally controlled buoyancy adjustment mechanism comprising:

a fluid pump having a fluid injection and extraction means operated by a control lever;

a fluid inlet line connecting the fluid injection and extraction means to the hollow interior of the float member;

a fluid outlet line connecting the lower end of the float into the hollow interior to the fluid injection and extraction means; and an air relief line attached near the upper end of the float member, the air relief line further connecting to an air valve located on the exterior of the vessel.

6. The apparatus as disclosed in claim 1, wherein:

the ball seal on the upper end of the float member is conformed to sealably engage the tapered interior seat of the upper housing, while the ball seal on the lower end of the float member is conformed to sealably engage the tapered interior seat of the lower housing the float member is contained between the upper housing and the lower taper valve housing when said housings are attached to the vessel, with the ball seals on the upper and lower ends of the float member not engaging the tapered interior seats of the upper and lower housings at the same time, allowing for either flow of a lighter fluid from the upper outlet, a heavier fluid flow from the lower outlet or flow of both the lighter fluid and the heavier fluid from the respective upper outlet and lower outlet, but never restricting the fluid flow from the upper outlet and lower outlet simultaneously.

7. The apparatus as disclosed in claim 1, wherein the apparatus is portable allowing for the apparatus to be moved from one fluid source to another without requiring disassembly of the apparatus.

8. An apparatus for separating and measuring mixed fluids of differing constituent specific gravity, attaching between a fluid source and a remote storage container, the apparatus comprising:

a vertically oriented vessel having an interior, an exterior surface, an upper outlet located in a top portion, a lower outlet through the exterior surface into the interior, located in a bottom portion and an inlet located between the top portion and bottom portion;

an adjustably buoyant float member positioned within the interior of the vessel, said float member having
- a hollow interior which may be filled with a neutral liquid ballast and means to inject liquid into or extract liquid from said hollow interior in order to adjust the buoyancy of said float member;
- an upper end separable from the float member allowing access to the hollow interior; and a lower end, each upper end and lower end having ball seals;

an upper housing having a tapered interior seat adapted to sealably engage the ball seal on the upper end of the float member, the upper housing attached to the upper outlet of the vessel;

a lower housing having a tapered interior seat adapted to sealably engage the ball seal on the lower end of the float member, the lower housing attached to the lower outlet of the vessel;

the ball seal on the upper end of the float member conformed to sealably engage the tapered interior seat of the upper housing, and the ball seal on the lower end of the float member conformed to sealably engage the tapered interior seat of the lower housing;

the float member is contained between the tapered interior seats of the upper and lower housings when said housings are attached to the vessel, with the ball seals on the upper and lower ends of the float member not engaging the tapered interior seats of the upper and lower housings at the same time, allowing for either flow of a lighter fluid from the upper outlet, a heavier fluid flow from the lower outlet or flow of both the lighter fluid and the heavier fluid from the respective upper outlet and lower outlet, but never restricting the fluid flow from the upper outlet and lower outlet simultaneously;

an external surge tank connecting to the inlet by an inlet line connection further connected to the fluid source, said surge tank also having an internal chamber and an outlet connection, attaching to the inlet of the vessel with the inlet line applied lower on the surge tank than the outlet connection;

a first pipeline connecting to the upper housing having a first fluid flow measuring meter measuring the quantity of fluid flowing from the upper outlet of the vessel;

a second pipeline connecting to the lower housing having a second fluid flow measuring meter measuring the quantity of fluid flowing from the lower outlet of the vessel; and, a third pipeline joining together after the two meters to carry the fluids to the remote storage container.

9. The apparatus as disclosed in claim 8, further comprising a float housing located within the interior of the vessel, connecting the upper outlet with the lower outlet with the float member contained within the float housing, wherein the float member has full and free movement within the float housing without contact with the float housing, said float housing having grooved channels allowing for the free flow of fluid in and out of the housing, from the interior of the vessel to the float member without restriction.

10. The apparatus as disclosed in claim 8, the apparatus having an externally controlled buoyancy adjustment mechanism allowing for the float member to have its buoyancy adjusted without the need to disassemble the apparatus or to manually fill the interior of the float member with the neutral liquid ballast, said externally controlled buoyancy adjustment mechanism comprising:

- a fluid pump having a fluid injection and extraction means operated by a control lever;
- a fluid inlet line connecting the fluid injection and extraction means to the hollow interior of the float member;
- a fluid outlet line connecting the lower end of the float into the hollow interior to the fluid injection and extraction means, and
- an air relief line attached near the upper end of the float member, the air relief line further connecting to an air valve located on the exterior of the vessel.

11. The apparatus as disclosed in claim 8, wherein the apparatus is portable allowing for the apparatus to be moved from one fluid source to another without requiring disassembly of the apparatus.

\* \* \* \* \*